United States Patent
Agarwal et al.

(10) Patent No.: US 7,120,335 B2
(45) Date of Patent: Oct. 10, 2006

(54) VERTICALLY AND LATERALLY CONFINED 3D OPTICAL COUPLER

(75) Inventors: Anuradha M. Agarwal, Weston, MA (US); Lionel C. Kimerling, Concord, MA (US); Hermann A. Haus, Lexington, MA (US); Kazumi Wada, Lexington, MA (US); Steven G. Johnson, St. Charles, IL (US); Christina Manolatou, Cambridge, MA (US); Jurgen Michel, Arlington, MA (US); Victor Trinh Nguyen, Walnut, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/141,317

(22) Filed: May 8, 2002

(65) Prior Publication Data

US 2003/0035633 A1    Feb. 20, 2003

Related U.S. Application Data

(60) Provisional application No. 60/289,627, filed on May 8, 2001.

(51) Int. Cl.
*G02B 6/26* (2006.01)
(52) U.S. Cl. .......................................... 385/39; 385/43
(58) Field of Classification Search .................. 385/39, 385/49, 27, 28, 14, 129
See application file for complete search history.

(56) References Cited

U.S. PATENT DOCUMENTS 4,737,015 A    4/1988  Ishida et al.
4,999,686 A    3/1991  Autier et al.
5,175,788 A    12/1992 Miura et al.
6,160,927 A    12/2000 Leclere et al.
2003/0044118 A1*  3/2003  Zhou et al. ................... 385/43
2004/0264903 A1*  12/2004 Dridi et al. ................. 385/129

FOREIGN PATENT DOCUMENTS

EP    0 731 367    9/1996
JP    1-183603    7/1989

OTHER PUBLICATIONS

M. Palamaru et al, "Photonic Crystal Waveguides: Out-of-plane Losses and Adiabatic Modal Conversion", Mar. 12, 2001, Applied Physics Letters, vol. 78, No. 11, p. 1466-1468.*
"Modes of Periodically Segmented Waveguides," Weissman et al. *Journal of Lightwave Technology*. Nov. 1993. vol. 11, No. 11.
"A Simple Laterally Tapered Wveguide for Low-Loss Coupling to Single-Mode Fibers," Kasaya et al. *IEEE Photonics Technology Letters*, vol. 5, No. 3, Mar. 1993.
"Planar Graded-Index (GRIN) PECVD Lens," Beltrami et al. *Electronics Letters*, vol. 32, No. 6, Mar. 14, 1996.
"Reduced Coupling Loss Using a Tapered-Rib Adiabatic-Following Fiber Coupler," Smith et al. *IEEE Photonics Technology Letters*, vol. 8, No. 8, Aug. 1996.
"Spot Size Reducer for Standard Single-Mode Fibers Utilizing a Graded-Index Fiber Tip," Shiraishi et al. *ECOC 97*, Sep. 1997, Conference Publication No. 448.

* cited by examiner

*Primary Examiner*—Sung Pak
(74) *Attorney, Agent, or Firm*—Gauthier & Connors

(57) ABSTRACT

An on-chip silicon-based optical coupler used to guide light from an optical fiber to a waveguide. The incoming wave is confined vertically by stacks of graded index materials. In the lateral direction, a linear taper formed by etched holes or trenches confines the wave.

16 Claims, 13 Drawing Sheets

VERTICALLY AND LATERALLY CONFINED 3D OPTICAL COUPLER

PRIORITY INFORMATION

This application claims priority from provisional application Ser. No. 60/289,627 filed May 8, 2001.

BACKGROUND OF THE INVENTION

The invention relates to the field of optical couplers, and in particular to optical couplers that couple light between optical fiber and on-chip optical waveguides.

Integrated Optical Circuits (IOCs) have been under development for a number of years. The designers of these circuits seek to integrate several optical functions on a single semiconductor chip. IOCs generally include waveguides formed from several layers of material. For example, in a two-dimensional planar waveguide, a core layer is sandwiched between two layers of clad material.

There is a need to couple light from optical fibers to these on-chip waveguides and vice versa. However, there are a number of other factors that complicate such coupling. First, IOCs are typically high index-contrast systems so as to provide stronger light confinement in smaller dimensions, while optical fibers are low index-contrast systems. That is, there is a much larger refractive index difference between a waveguide's core and cladding than between a fiber's core and cladding. Second, there is a mode diameter mismatch between fibers and waveguides. For example, a fiber may have a core diameter of 8–10 µm, while a single-mode waveguide core may have a width of 0.6–2 µm and thickness of 0.6–2.0 µm. Lastly, there is a mode shape mismatch. Fiber typically maintains a circular mode field, while waveguides typically maintain an elliptical mode field. Thus, as shown in FIG. 1, if a fiber is directly butt-coupled to a waveguide, high power losses occur. In FIG. 1 the fiber is directly butt-coupled to the waveguide at z=4 µm.

Some common fiber-to-chip coupling schemes have arisen in an attempt to overcome such losses. To confine light in the vertical dimension, prior schemes have used GRIN lenses on the fiber-side or high silica graded index stacks on-chip. For example, Shiraishi et al in *"Spot size reducer for standard SMF utilizing a graded-index fiber tip,"* 11th International Conference Optical Communications- Vol. 1, No. 97- pp 50–3, has demonstrated that a tip with a square-law index profile can be used as a spot size reducer. In this paper, the authors reported a method to reduce the single-mode fiber spot size to 5 µm that uses a quarter-pitch length of a graded-index fiber (GIF).

On the chip side, a planar GRIN lens on silica has been fabricated as described by Beltrami et al in *"Planar graded-index (GRIN) PECVD lens,"* Electronics Letters-14th 96- Vol. 32; No. 6, pp 549–50. In this paper, the author varies n around 1.44 by adjusting the F doping ($CF_4$ flow in oxide PECVD). The periodic refocusing effect of the parabolic profile is demonstrated. Use of doping to achieve the profile, however, prevents an index of refraction higher than 1.46.

To confine light in the lateral dimension, a laterally tapered waveguide has been used to couple from a photonic device to a single-mode fiber. However, a direct tapered structure has not been used for coupling from a single-mode fiber to a waveguide since there is no practical way to vertically taper an on-chip structure to provide vertical confinement. A lateral taper alone still results in high-coupling loss. One way to solve the problem is a tapered rib waveguide used in conjunction with a much bigger mesa waveguide underneath, as shown by Smith et al in *"Reduced coupling loss using a tapered-rib adiabatic-following fiber coupler"* IEEE Photonics Technology Letters Vol. 8, No. 8, August 96- pp 1052–4. Light is injected in the mesa, coupling up due to higher n and the tapered ridge. This device still has a size on the millimeter order.

Whatever the precise merits, features and advantages of the above cited references, none of them achieve or fulfills the purposes of the invention.

SUMMARY OF THE INVENTION

One aspect of the invention provides an optical coupler used to guide light from an optical fiber to a waveguide. The optical coupler comprises a vertical stack of varying refractive index layers formed on a cladding layer. The layers gradually decrease in refractive index from a top layer to a center layer and then increase from the center layer to a bottom layer formed on the cladding layer. The vertical stack has at least one pair of horizontally spaced trenches or periodic holes that increase in dimensions from a first end of the stack to a second end of the stack so as to form a tapered shape in the stack.

Another aspect of the invention provides a method of producing an optical coupler used to guide light from an optical fiber to a waveguide. A cladding layer is provided. A vertical stack of varying refractive index layers is formed by depositing layers of varying refractive index material on the cladding layer. The layers gradually decrease in refractive index from a top layer to a center layer and then increase from the center layer to a bottom layer. At least one pair of horizontally spaced trenches or periodic holes are etched in the vertical stack that increase in dimensions from a first end of the stack to a second end of the stack so as to form a tapered shape in the stack.

DETAILED DESCRIPTION OF THE INVENTION

The invention provides for an on-chip optical coupler used to guide light from an optical fiber to a waveguide. The incoming wave is confined vertically by stacks of graded index materials. In the lateral direction, a linear taper formed by etched holes or trenches confines the wave.

The present invention allows for a coupler to be fabricated that reduces the spot size of incoming infrared light (1550 nm) from a diameter of 8–10 μm to less than 1 μm when coupling such light from a single mode fiber to a single mode silicon nitride waveguide. The present invention also allows such a coupler to be on the order of one hundred microns in size.

Figure 1:
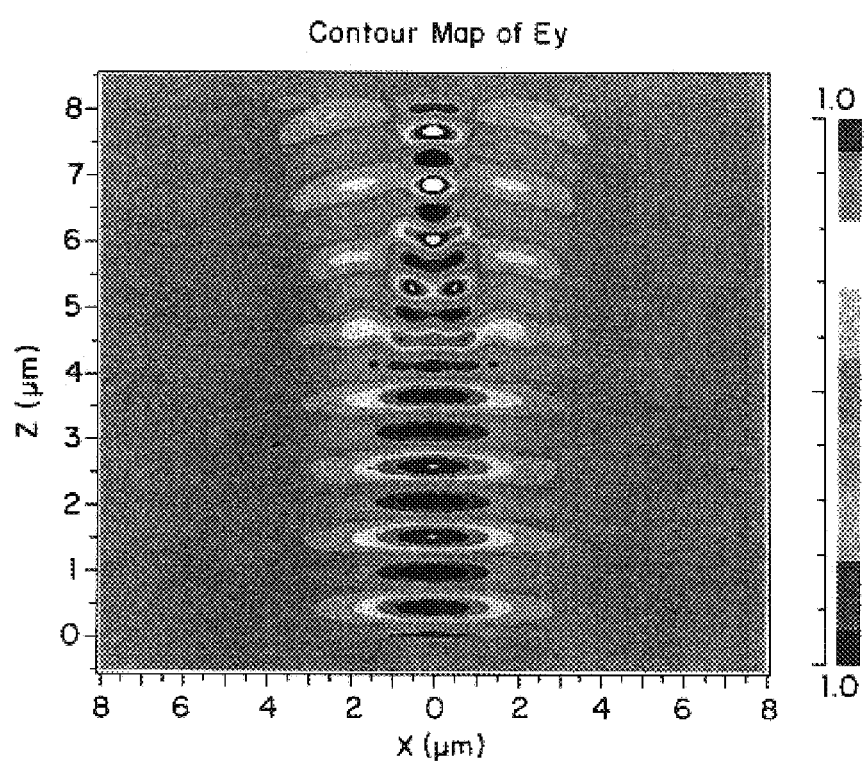
FIG. 1 illustrates the high power losses that occur if a fiber is directly butt-coupled to a waveguide.
Figure 2A:
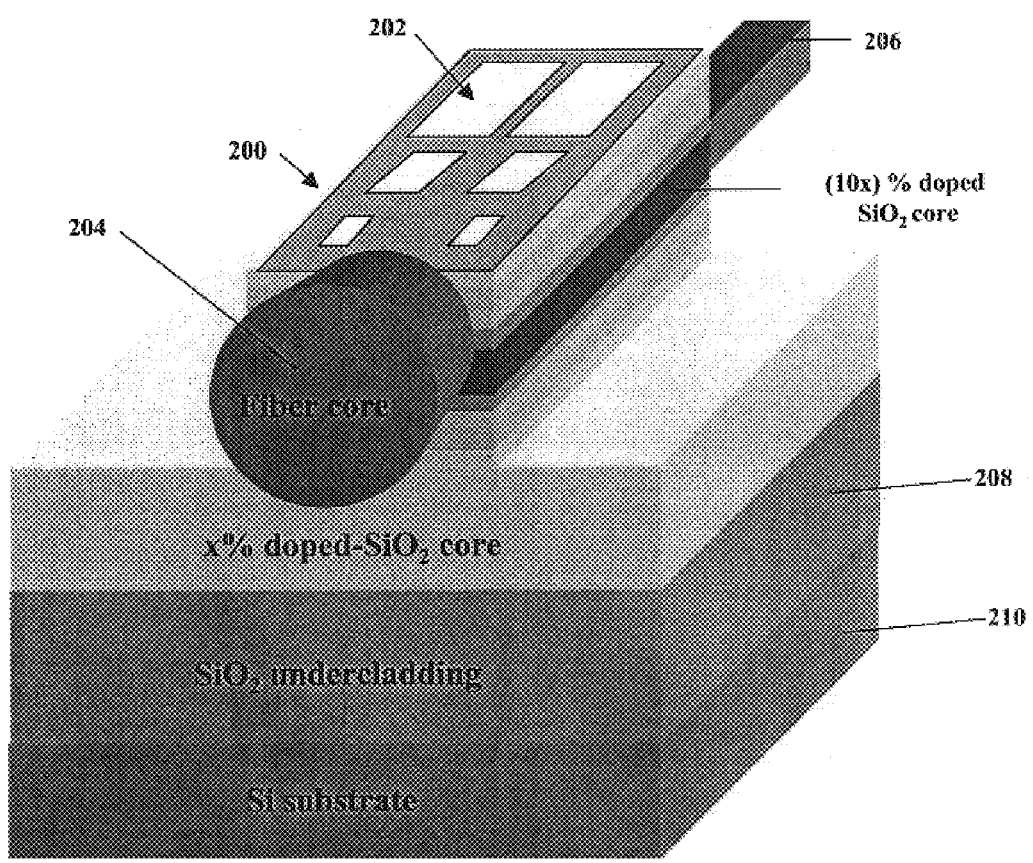
FIG. 2a illustrates a birds-eye view of a three-dimensional fiber-to-waveguide coupler according to the principles of the present invention.
Figure 2B:
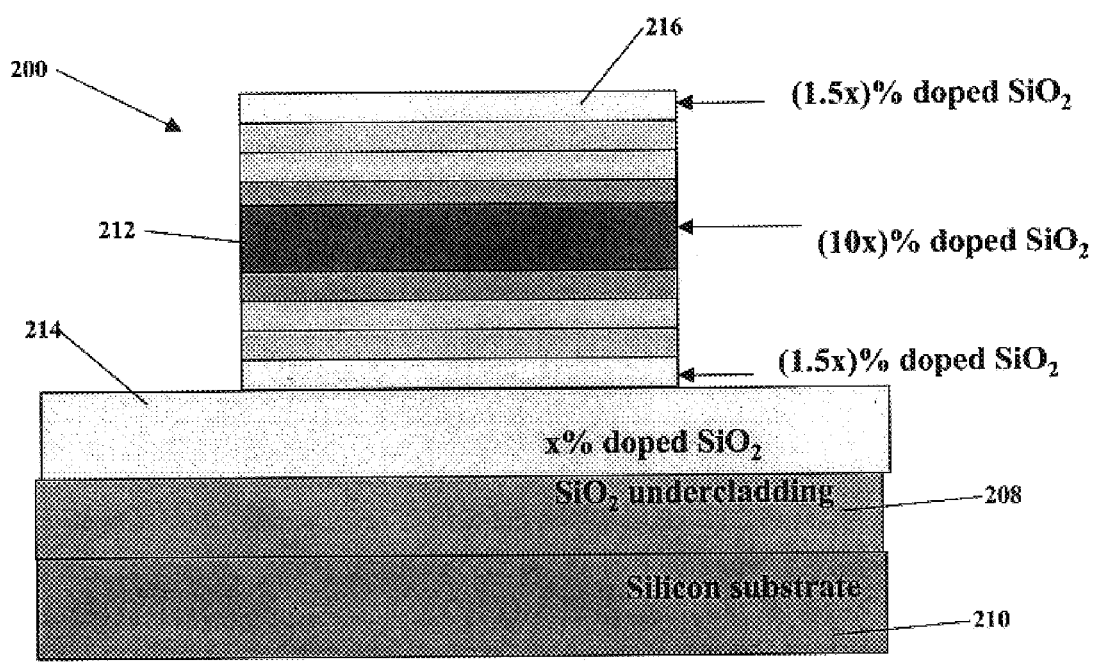
FIG. 2b a side view of a three-dimensional fiber-to-waveguide coupler according to the principles of the present invention.

FIG. 2a illustrates a birds-eye view of a three-dimensional fiber-to-waveguide coupler 200 according to the principles of the present invention. As shown, coupler 200 is a waveguide formed on-chip that couples light from an optical fiber 204 to a waveguide 206 made of, for example, silicon nitride (SiN) or silicon oxynitride (SiON). Waveguide 200 is formed by depositing layers of a core material having varying refractive indexes on an underlying cladding 208, which is formed on top of a substrate 210. Preferably, waveguide 206 is integrated into center layer 212, thus eliminating the out-coupling loss to waveguide 206. Referring to FIG. 2b, which illustrates a side view of coupler 200, the varying index layers gradually decrease in refractive index from the top of coupler 200 to the center and then increase from the center of coupler 200 towards the lower cladding. For example, a top layer 216 is (1.5×) % doped $SiO_2$ (doped with, for example, N). Moving towards the center, each layer is increasingly doped to increase the index until center layer 212, which is (10×) % doped $SiO_2$. Moving from center layer 212, each layer is decreasingly doped until bottom layer 214 on top of undercladding layer 208. This layer is x % doped $SiO_2$. This vertical stack of varying refractive index layers compresses the optical mode in the vertical direction towards the middle of the structure.

Figure 2C:
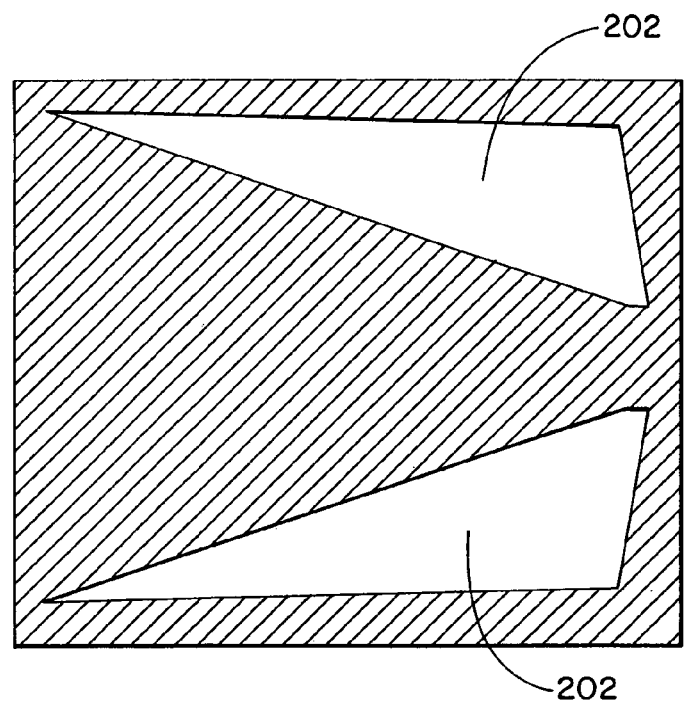
FIG. 2c a top view of a three-dimensional fiber-to-waveguide coupler according to the principles of the present invention using etched trenches.
Figure 2D:
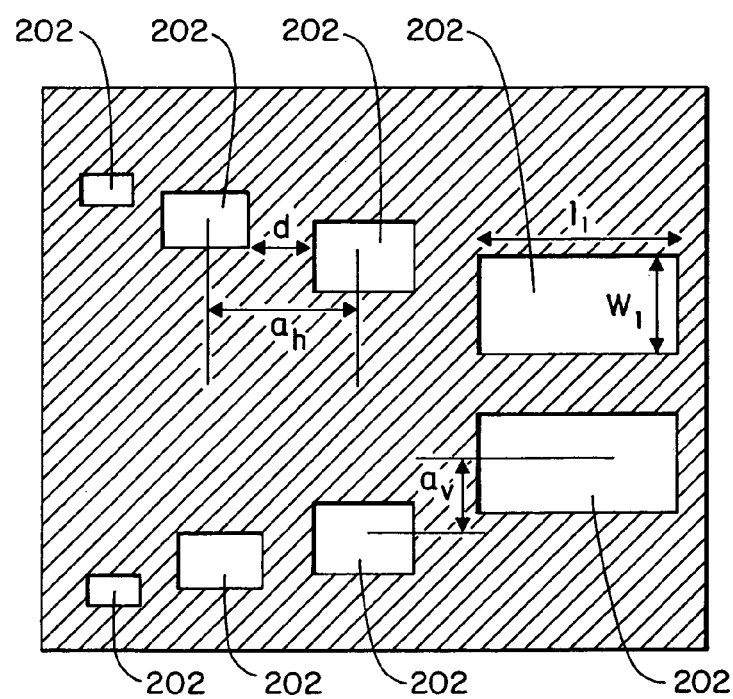
FIG. 2d a top view of a three-dimensional fiber-to-waveguide coupler according to the principles of the present invention using etched periodic holes.

Waveguide 200 also has horizontally etched trenches or periodic holes 202 that increase in dimensions from the fiber-end of waveguide 200 to the waveguide-end so as to form a tapered shape in the stack. FIG. 2c illustrates a top view showing etched trenches, while FIG. 2d illustrates a top view showing etched periodic holes. The etched trenches or holes provide a graded effective index contrast with the highest contrast at the waveguide-end. This guides light towards the middle of the structure, laterally.

When periodic holes are used as shown in FIG. 2d, the periodicity ($a_h$, $a_v$) of the holes is less than half the wavelength of light in the medium to allow guided modes. Also, the dimensions ($l_1$, $w_1$) of the holes or trenches are on the order of the wavelength of the light in the medium to avoid scattering. While the holes/trenches can be air filled, they are preferably back-filled with a solid material to provide greater mechanical stability for the structure.

Figure 3A:
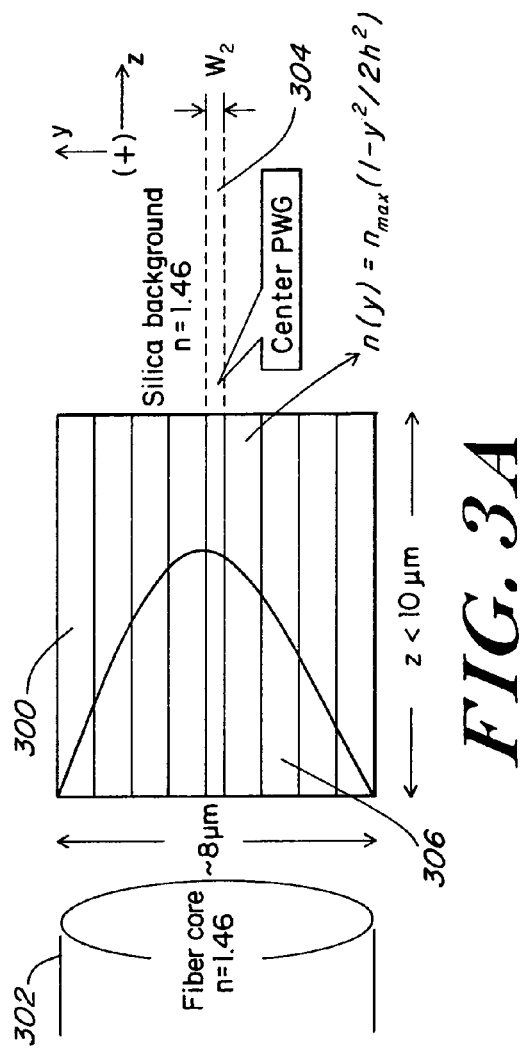
FIGS. 3a and 3b illustrates the general design parameters for simulations of the vertical confinement for a coupler according to the principles of the present invention.
Figure 3B:
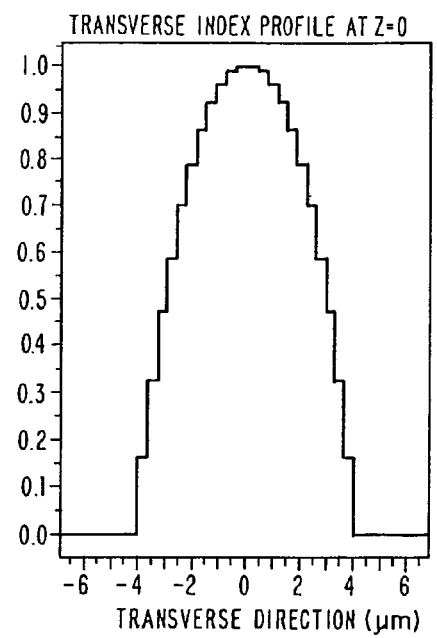

FIG. 3a illustrates the general design parameters for simulations of the vertical confinement for a coupler 300 according to the principles of the present invention. Coupler 300 is generally designed to couple between a silica optical fiber 302 (n=1.46; core diameter 8–10 μm) and a single-mode waveguide 304 (n=2.0–2.5; width=0.8–2.0 μm; thickness=0.8–2.0 μm). Coupler 300 has a refractive index increasing parabolically from 1.46 to $n_{max}$, where $n_{max}$ is the refractive index of center layer 306. That is, $n(y)=n_{max}(1-y^2/2h^2)$ where y is the vertical distance from the center; and h correlates the stack thickness and its maximum, minimum indices of refraction. The normalized n(y) profile is illustrated in FIG. 3b. Coupler 300 is 8 μm high and has a length less than 10 μm.

Figure 3C:
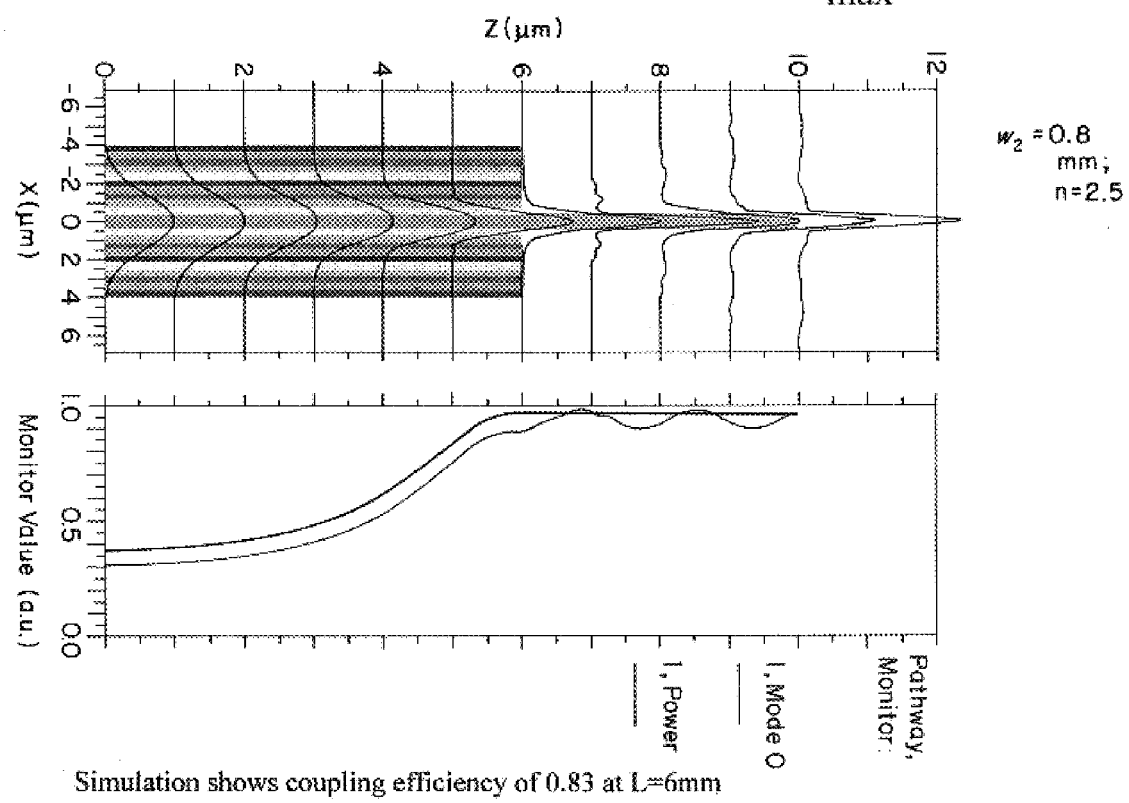
FIGS. 3c, 3d and 3e illustrate beam propagation simulations for differing parameters of the coupler of FIG. 3a with a Gaussian input wave.
Figure 3D:
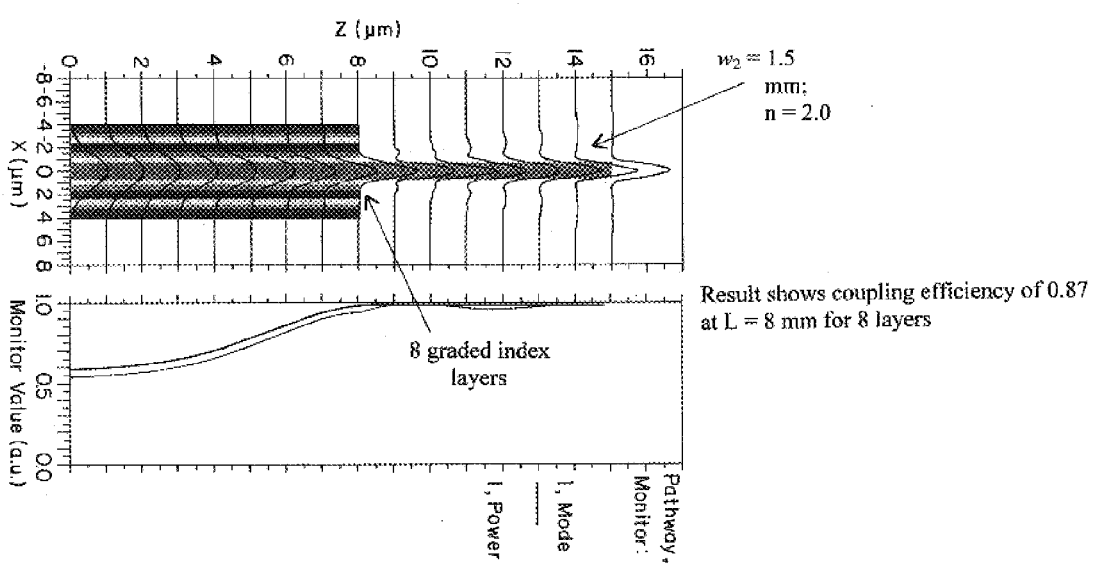
Figure 3E:
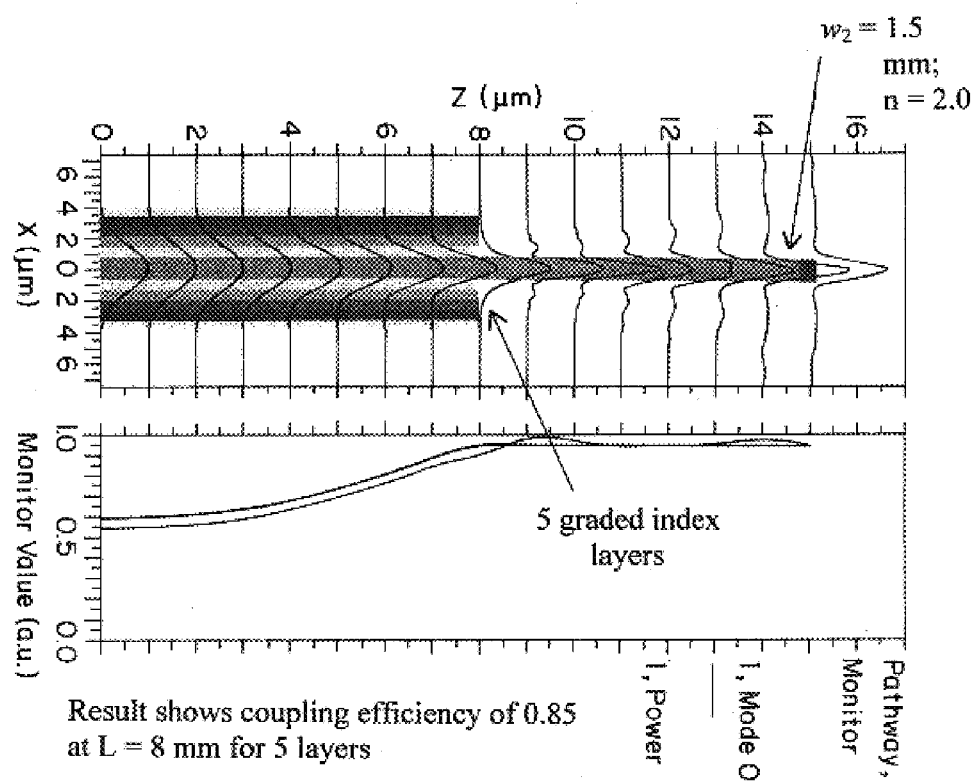

FIGS. 3c, 3d and 3e illustrate beam propagation simulations for coupler 300 with a gaussian input wave at a waist of 8 μm. The following table summarizes the parameters and coupling efficiency of the simulations shown in these figures:

|  | $n_{max}$ | Δn | Center waveguide thickness ($w_2$) [μm] | # of layers (top or bottom) | Coupling Efficiency | Length of coupler at max efficiency [μm] |
| --- | --- | --- | --- | --- | --- | --- |
| FIG. 3c | 2.0 | 0.54 | 1.5 | 5 | 0.85 | 8 |
| FIG. 3d | 2.0 | 0.54 | 1.5 | 8 | 0.87 | 8 |
| FIG. 3e | 2.5 | 1.04 | 0.8 | 10 | 0.83 | 6 |

Figure 3F:
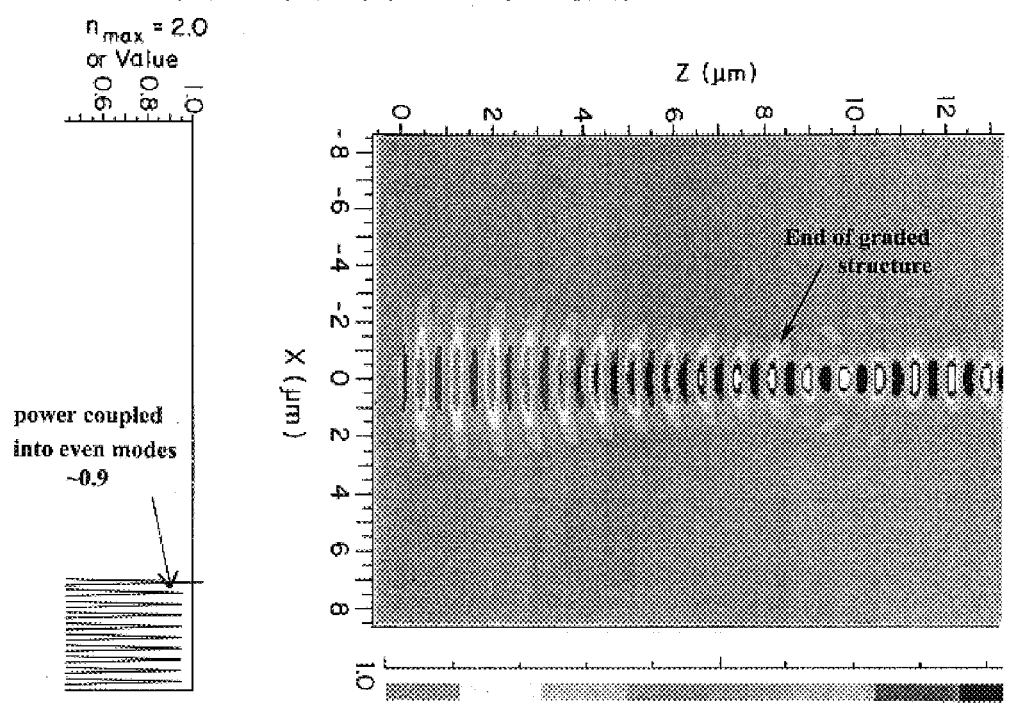
FIGS. 3f illustrates FDTD (finite difference time domain) simulations for differing parameters of the coupler of FIG. 3a with a Gaussian input wave.

As can be seen from the simulations, the number of graded index layers does not significantly affect the coupling efficiency. Therefore, there is a high tolerance in processing this vertical structure. FIG. 3f illustrates a finite difference time domain (FDTD) simulation for coupler 300 with $n_{max}$=2.0, 8 layers, and a length of 8 μm.

Figure 4A:
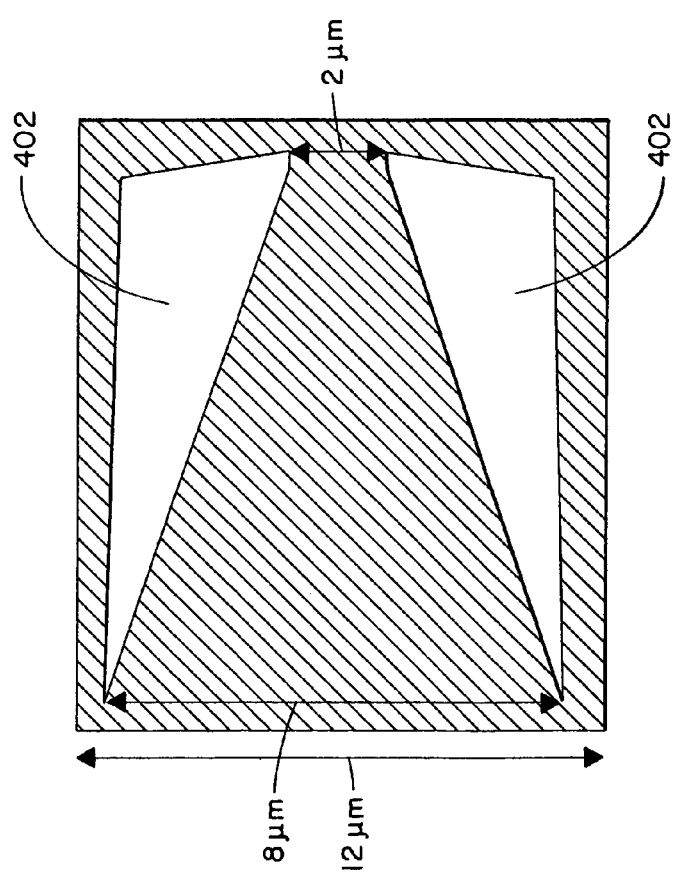
FIG. 4a illustrates the general design parameters for simulations of the lateral confinement for a coupler according to the principles of the present invention.

FIG. 4a illustrates the general design parameters for simulations of the lateral confinement for a coupler 400 according to the principles of the present invention. Coupler 400 is generally designed to couple between a silica optical fiber 402 (n=1.46; core diameter 8–10 μm) and a single-mode waveguide 404 (n=2.0–2.5; width=0.6–2.0 μm; thickness=0.6–2.0 μm). Coupler 400 has tapered trenches 402 in it for lateral confinement. Trenches 402 increase in dimension from a fiber-end to a waveguide-end. The width between the trenches at the fiber-end is 8 μm and 2 μm at the waveguide-end. Coupler 400 is 12 μm wide. Trenches 402 are air-filled.

Figure 4B:
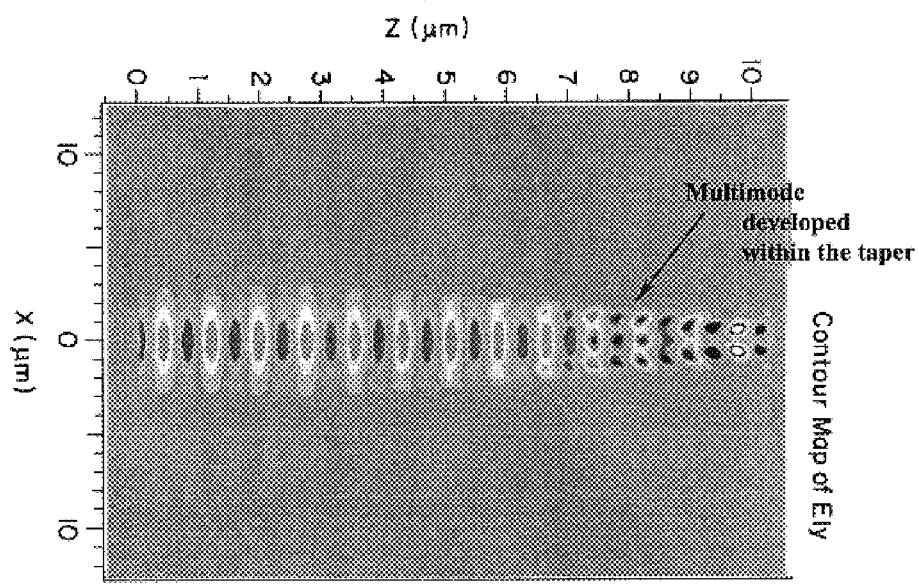
FIGS. 4b, 4c, and 4d illustrate FDTD simulations for the coupler of FIG. 4a with different lengths.
Figure 4C:
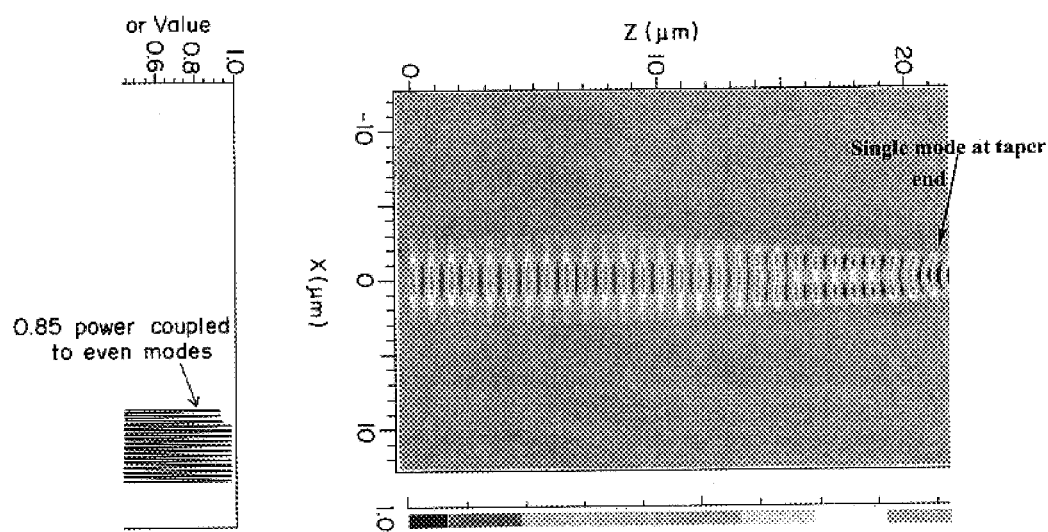
Figure 4D:
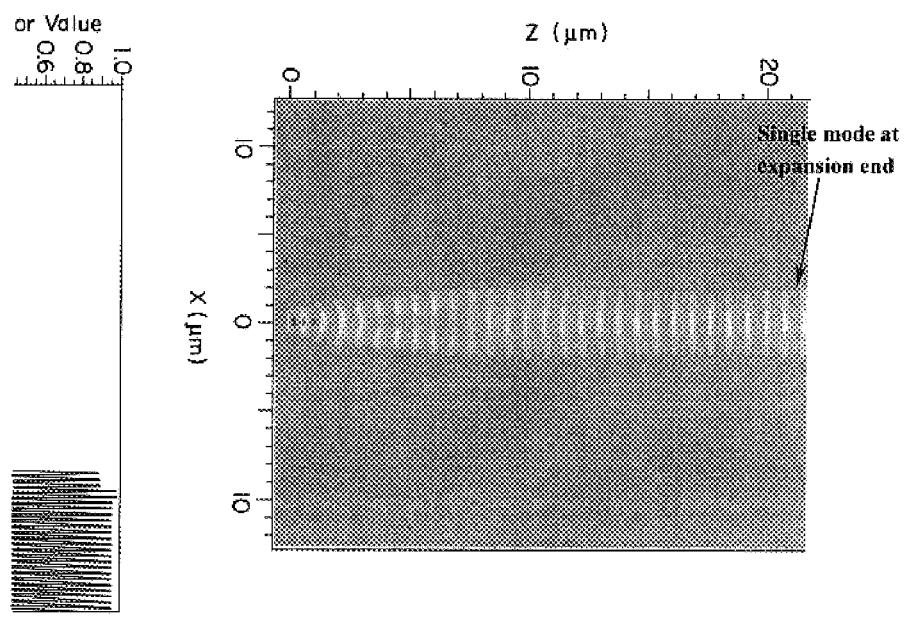

FIGS. 4b, 4c, and 4d illustrate FDTD simulations for coupler 400 with different lengths. FIG. 4b illustrates FDTD results for a coupler length of 10 μm. As can be seen, for a coupler length this short, multimode develops within the taper, causing a low coupling to the fundamental mode. However, as shown in FIG. 4c, when the length is increased to 25 μm, there is only a single mode at the taper end and approximately 0.85 power is coupled to even modes. Similarly, as illustrated in FIG. 4c, there is only a single mode at the fiber-end for an inverse propagation from waveguide to fiber when the length is 25 μm.

One of skill in the art will appreciate that the coupler can be any type of waveguide, such as a ridge, strip or channel waveguide. Also, the index grading in the vertical direction can take on a number of different functions. For example, the grading function can be a parabolic, exponential, sine, cosine, or sinh function. Furthermore, materials for the vertical stack other than $SiO_2$ can be used, such as SiON or SiN.

Although the present invention has been shown and described with respect to several preferred embodiments thereof, various changes, omissions and additions to the form and detail thereof, may be made therein, without departing from the spirit and scope of the invention.

What is claimed is:

1. An optical coupler used to guide light from an optical fiber to a waveguide comprising:
   a cladding layer;
   a width taper region comprising a vertical stack of varying refractive index layers, wherein the layers gradually increase in refractive index from a top layer to a center layer and then decrease from the center layer to a bottom layer formed on the cladding layer;

at least one pair of horizontally spaced trenches or periodic holes in the vertical stack that increase in dimensions from said optical coupler to said waveguide so as to form a width tapered shape in the stack so as to allow a plurality of modes to be present in said optical coupler.

2. The coupler as per claim 1, wherein the at least one pair of trenches or holes are back-filled with a material that has a higher refractive index than air.

3. The coupler as per claim 1, wherein the waveguide is integrated with the center layer.

4. The coupler as per claim 1, wherein at least one layer of the stack is made of $SiO_2$.

5. The coupler as per claim 1, wherein at least one layer of the stack is made of SiON.

6. The coupler as per claim 1, wherein the at least one layer of the stack is made of SiN.

7. The coupler as per claim 1, wherein the waveguide is made of any one of: SiN or SiON.

8. The coupler as per claim 1, wherein the layers decrease and increase according to a grading function that is any one of: a parabolic, exponential, sine, cosine, or sinh function.

9. A method of producing an optical coupler used to guide light from an optical fiber to a waveguide, the method comprising:

providing a cladding layer;

forming a taper region comprising a vertical stack of varying refractive index layers by depositing layers of varying refractive index material on the cladding layer, wherein the layers gradually increase in refractive index from a top layer to a center layer and then decrease from the center layer to a bottom layer;

etching at least one pair of horizontally spaced trenches or periodic holes in the vertical stack that increase in dimensions from the said optical coupler to said waveguide so as to form a width tapered shape in the stack so as to allow a plurality of modes to be present in said optical coupler.

10. The coupler as per claim 9, wherein the at least one pair of trenches or holes are back-filled with a material that has a higher refractive index than air.

11. The coupler as per claim 9, wherein the waveguide is integrated with the center layer.

12. The coupler as per claim 9, wherein at least one layer of the stack is made of $SiO_2$.

13. The coupler as per claim 9, wherein at least one layer of the stack is made of SiON.

14. The coupler as per claim 9, wherein the at least one layer of the stack is made of any one of: SiN or SiON.

15. The coupler as per claim 9, wherein the waveguide is made of SiN.

16. The coupler as per claim 8, wherein the layers decrease and increase according to a grading function that is any one of: a parabolic, exponential, sine, cosine, or sinh function.

* * * * *